United States Patent
Sato et al.

[11] Patent Number: 6,028,976
[45] Date of Patent: Feb. 22, 2000

[54] SPLIT TYPE RIBBON OPTICAL FIBER CORE CABLE

[75] Inventors: Toshihisa Sato; Tomoyuki Hattori; Kohei Kobayashi; Kaoru Okuno; Ken Takahashi; Ryoei Oka, all of Yokohama, Japan

[73] Assignee: Sumitomo Electric Industries, Ltd., Osaka, Japan

[21] Appl. No.: 08/972,542

[22] Filed: Nov. 18, 1997

[30] Foreign Application Priority Data

Nov. 18, 1996 [JP] Japan .................................. 8-321172

[51] Int. Cl.⁷ ...................................................... G02B 6/44
[52] U.S. Cl. ............................................................ 385/114
[58] Field of Search .................................... 385/100–114

[56] References Cited

U.S. PATENT DOCUMENTS

| | | | |
|---|---|---|---|
| 5,524,164 | 6/1996 | Hattori et al. | 385/114 |
| 5,621,838 | 4/1997 | Nomura et al. | 385/100 |
| 5,761,363 | 6/1998 | Mills | 385/114 |
| 5,802,231 | 9/1998 | Nagano et al. | 385/114 |

FOREIGN PATENT DOCUMENTS

| | | |
|---|---|---|
| 636913 | 2/1995 | European Pat. Off. . |
| 1-138518 | 5/1989 | Japan . |
| 4-163411 | 6/1992 | Japan . |
| 4-166808 | 6/1992 | Japan . |
| WO 94/23323 | 10/1994 | WIPO . |

*Primary Examiner*—Akm E. Ullah
*Attorney, Agent, or Firm*—Pillsbury Madison & Sutro LLP

[57] ABSTRACT

In a split type ribbon optical fiber core cable capable of being split into cables, there are a plurality of ribbon optical fiber core cable units, each of which are constituted by a plurality of colored optical fiber core cables arranged in a row; a coating resin of an ultraviolet curable resin wholly coats the plurality of colored optical fiber core cables; and a bonding resin of an ultraviolet curable resin bonds the ribbon optical fiber core cable units arranged in a row. In this cable, an adhesion strength between the coating resin and the bonding resin is in the range of 1 to 100 g/cm. Further, the bonding resin after curing has a Young's modulus of from 5 to 100 kg/mm². The bonding resin after curing has an elongation coefficient of from 5 to 80%.

9 Claims, 3 Drawing Sheets

SPLIT TYPE RIBBON OPTICAL FIBER CORE CABLE

BACKGROUND OF THE INVENTION

1. Field of the Invention

The present invention relates to a split type ribbon optical fiber core cable in which a plurality of optical fiber tape core cables, each of which consists of a plurality of colored optical fiber core cables arranged in flat arrangement and united with each other, are arranged in a row, united with each other and capable of splitting apart from each other.

2. Description of the Related Art

Unexamined Japanese Patent Publication (kokai) No. Hei. 4-163411 discloses a conventional method for producing a split type ribbon optical fiber core cable which uses a split unit coated with a soft resin at a split position to avoid unnecessary splitting of the split type ribbon optical fiber core cable and to be capable of easily finding the split position as seen from its exterior. Also, in the method, the split unit and the optical fibers are completely coated with a hard resin so that the split position can be felt by and incorrect splitting avoided.

However, the above conventional cable tape has a drawback; splitting the cable tape may expose an optical fiber or detach an optical fiber from the coating resin.

These troubles arise because of the poor adhesion in the split position between the optical fiber surface and the united coating resin. Specifically, when the above split type ribbon optical fiber core cable is split, the coating resin peels off the optical fiber leaving a surface whose adhesion to the resin is relatively low, resulting in optical fiber detachment.

Also, Unexamined Japanese Patent Publication No. Hei. 4-166808 discloses another method in which the thickness of an ribbon optical fiber core cable is reduced to a value almost equal to the outer diameter of the optical fibers and the adhesion strength between the optical fiber surface and the coating resin is regulated to a value in a specific range in terms of 90° peel strength so that the ribbon optical fiber core cable can be easily split when twisted.

However, in the above ribbon optical fiber core cable, there is the possibility that the cable tape may develop cracks when twisted.

The cracking occurs because the twisting of the ribbon optical fiber core cable imposes a strain on the coating interface within the ribbon optical fiber core cable.

Unexamined Japanese Patent Publication No. Hei. 1-138518 discloses a technique in which a bonding resin material having a different elongation coefficient is used to bond ribbon optical fiber core cables to each other in order to facilitate the splitting of the united ribbon optical fiber core cables.

However, in the above technique, use of a bonding resin having a reduced elongation coefficient results in cracking upon application of an external force.

This is because the bonding resin having a reduced elongation coefficient is more apt to develop cracks upon bending.

SUMMARY OF THE INVENTION

It is an object of the present invention to provide a split type ribbon optical fiber core cable which not only can be split into the ribbon optical fiber core cable units without fail, but also does not suffer an increase in transmission loss even in a moist-heat or hot-water environment.

A split type ribbon optical fiber core cable capable of being split into cables, comprises a plurality of ribbon optical fiber core cable units, each unit comprising a plurality of colored optical fiber core cables arranged in a row; a wholly coating resin comprising an ultraviolet curable resin which wholly coats the plurality of colored optical fiber core cables; and a bonding resin comprising an ultraviolet curable resin which bonds the ribbon optical fiber core cable units arranged in a row; wherein an adhesion strength between the wholly coating resin and the bonding resin is in the range of 1 to 100 g/cm.

According to the present invention, since the adhesion strength between the bonding resin and the coating resin is in the given range, the split type ribbon optical fiber cable not only can be split into the ribbon optical fiber cable units without fail, but does not suffer an increase in transmission loss even in a moist-heat or hot-water environment.

DETAILED DESCRIPTION OF THE INVENTION

Figure 1:
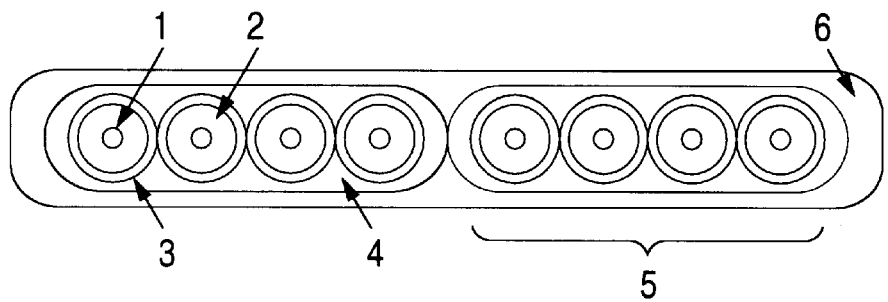
FIG. 1 is a sectional view illustrating the sectional structure of a representative embodiment of the split type ribbon optical fiber core cable of the present invention in which ribbon optical fiber core cables are arranged in a row and completely covered with a bonding resin.

The present invention will be explained below in detail.

The present inventors made extensive investigations on the problems described above. As a result, they have found that the above described problems can be solved by regulating the adhesion strength between a wholly coating resin and a bonding resin to a value in a given range, and by further regulating the Young's modulus and elongation coefficient of the cured bonding resin to values respectively in given ranges. The present invention has been completed based on this finding.

The present invention provides a split type ribbon optical fiber core cable capable of being split into cables, said split type ribbon optical fiber core cable including ribbon optical fiber core cable units, each unit consisting of a plurality of colored optical fiber core cables arranged in a row and a wholly coating resin consisting of ultraviolet curable resin which wholly coats the plurality of colored optical fiber core cables, and a bonding resin consisting of a ultraviolet curable resin which bonds the ribbon optical fiber core cable units arranged in a row, wherein an adhesion strength between the wholly coating resin and the bonding resin is from 1 to 100 g/cm.

In the split type ribbon optical fiber core cable as described above, the bonding resin after curing may have a Young's modulus of from 5 to 100 kg/mm².

In the split type ribbon optical fiber core cable as described above, the bonding resin after curing may have an elongation coefficient of from 5 to 80%.

The split type ribbon optical fiber core cable of the present invention contains a protective coating layer (bonding resin) as a component thereof. This protective coating layer may consist of a first coating layer which is a flexible layer formed from an ultraviolet-curable resin. Alternatively, the protective coating layer may consists of the first coating layer and, formed thereon, a second coating layer which is a rigid layer formed likely from an ultraviolet-curable resin.

The wholly coating resin may be the same resin as any of the ultraviolet-curable resins for forming the protective coating layer.

The bonding resin is desirably selected from the above ultraviolet-curable resins so that the given adhesion strength, Young's modulus, and elongation coefficient are obtained.

Examples of the ultraviolet-curable resins include urethane acrylates, ester acrylates, epoxy acrylates, butadiene acrylates, and silicone acrylates. A suitable ultraviolet-curable resin which gives a rigid or soft resin through curing may be selected according to need.

In the present invention, the adhesion strength between the wholly coating resin and the bonding resin should be from 1 to 100 g/cm and is preferably from 2 to 70 g/cm, more preferably from 3 to 50 g/cm, when the cable tape is split into the individual ribbon optical fiber core cable units each comprising colored optical fibers united with each other with the wholly coating resin.

If the adhesion strength between the two resins exceeds 100 g/cm, a splitting operation results in the tear of not only the bonding resin but also the wholly coating resin. There is hence a fear that the wholly coating resin may peel off a colored optical fiber or the colored optical fiber may detach from the other parts.

If the adhesion strength between the two resins is as low as below 1 g/cm, partial peeling occurs at the interface between the two resins when the split type ribbon optical fiber core cable is exposed to moist heat or immersed in hot water. As a result, water penetrates into the resultant spaces to cause an increase in transmission loss.

Consequently, in the case where the adhesion strength between the wholly coating resin and the bonding resin is within the range specified above, the split type ribbon optical fiber core cable not only can be split into the individual ribbon optical fiber core cable units without fail, but also is free from an increase in transmission loss even upon exposure to moist heat or immersion in hot water.

In the present invention, the Young's modulus of the bonding resin after curing should be from 5 to 100 kg/mm², and is preferably from 10 to 70 kg/mm², more preferably from 15 to 60 kg/mm².

If the Young's modulus of the cured bonding resin exceeds 100 kg/mm², the resin is so rigid that splitting during data transmission results in splitting-impulse noises, which cause errors in transmission signals. For example, while the signal transmission at 2 Mbps, the code error rate which is generally less than $10^{-12}$ instantaneously exceeds $10^{-9}$.

If the Young's modulus of the cured bonding resin is lower than 5 kg/mm², the resin is so flexible that the split type ribbon optical fiber core cable which is being produced may split into the ribbon optical fiber core cable units.

In the present invention, the elongation coefficient of the bonding resin after curing should be from 5 to 80%, and is preferably from 10 to 60%, more preferably from 20 to 50%.

If the elongation coefficient of the bonding resin is lower than 5%, the bonding resin develops cracks when the split type ribbon optical fiber core cable is bent by a roller or the like at the time of producing a cable, resulting in poor handleability.

If the elongation coefficient of the bonding resin exceeds 80%, the bonding resin is difficult to tear, making the cable difficult to split.

The present invention will be explained below in more detail by reference to the following embodiments, but the scope of the invention should not be construed as being limited by these embodiments.

FIG. 1 is a sectional view illustrating the sectional structure of a representative split type ribbon optical fiber core cable according to the present invention. In this embodiment, two ribbon optical fiber core cables are arranged in a row and wholly covered with a bonding resin.

In FIG. 1, numeral 1 denotes a glass fiber; 2, a protective coating layer; 3, a colored layer; 4, a wholly coating resin; 5, an ribbon optical fiber core cable; 6, a bonding resin; and 7, a split type ribbon optical fiber core cable.

Figure 2:
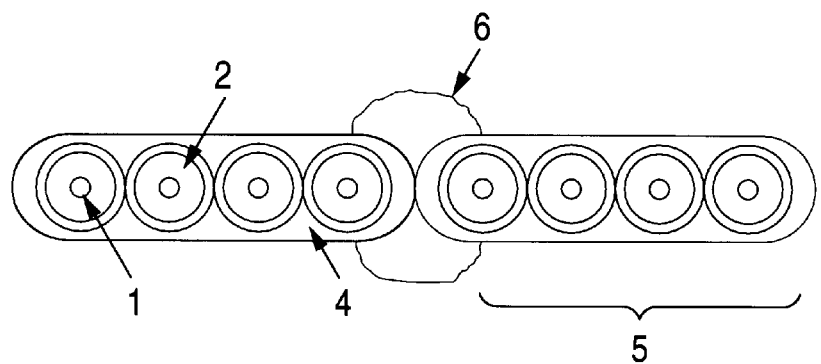
FIG. 2 is a sectional view illustrating the sectional structure of another embodiment of the split type ribbon optical fiber core cable of the present invention in which ribbon optical fiber core cables arranged in a row and bonded to each other with a bonding resin applied in a given width.
Figure 3:
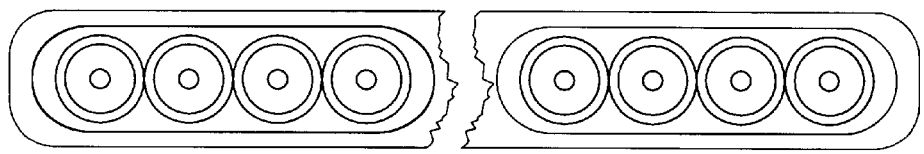
FIG. 3 is a schematic view illustrating a split type ribbon optical fiber core cable having satisfactory suitability for splitting.
Figure 4:
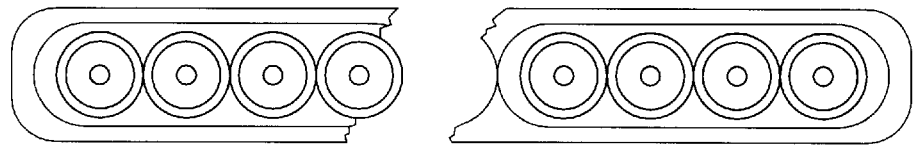
FIG. 4 is a schematic view illustrating a split type ribbon optical fiber core cable in which an optical fiber surface has been exposed.
Figure 5:
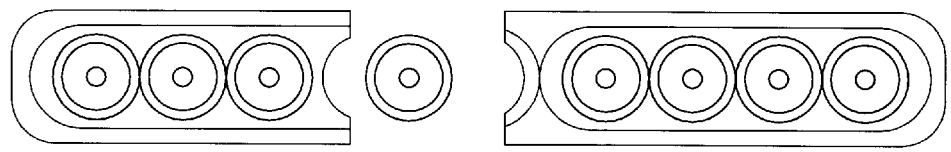
FIG. 5 is a schematic view illustrating a split type ribbon optical fiber core cable in which an optical fiber has detached from the other parts.

FIG. 2 is a sectional view illustrating the sectional structure of another split type ribbon optical fiber core cable according to the present invention. In this embodiment, two or more ribbon optical fiber core cables are arranged in a row and bonded to each other with a bonding resin applied in a given width.

Optical fibers were produced which each consisted of a single-mode glass fiber 1 coated with a protective coating layer 2, as shown in FIG. 1. The protective coating layer had a two-layer structure composed of a flexible layer as a first coating layer and a rigid layer as a second coating layer, which were formed from ultraviolet-curable urethane acrylate resins.

Colored optical fibers having a colored layer 3 were produced from the above-obtained optical fibers by applying an ultraviolet-curable ink containing an epoxy acrylate or a urethane acrylate as the main ingredient to the optical fibers and curing the ink.

Four such colored optical fibers were arranged in parallel on the same plane, and united with each other by means of a wholly coating resin 4 consisting of an ultraviolet-curable urethane acrylate resin. Thus, two ribbon optical fiber core cables 5 were produced. Here, five types of the ribbon optical fiber core cable cable in which 2.0%, 1.0%, 0.5%, 0.3% and no silicone oils are mixed with the wholly coating resin 4 were produced.

The ribbon optical fiber core cables 5 were arranged in parallel on the same plane, and bonded to each other with a bonding resin 6 consisting of an ultraviolet-curable urethane acrylate resin having the properties shown in Table 1. Thus, a split type ribbon optical fiber core cable 7 was produced, which is shown in FIG. 1.

(Evaluation Test)

The adhesion strength between the ultraviolet-curable bonding resin 6 and the wholly coating resin 4 was measured and charted as follows.

The wholly coating resin was applied to a polyester sheet in a thickness of from 40 to 50 μm, and then cured by irradiation with ultraviolet in an irradiation dose of 500 mJ/cm$^2$. Thereafter, the bonding resin was applied to the cured wholly coating resin in a thickness of from 40 to 50 μm, and then cured by irradiation with ultraviolet in an irradiation dose of 500 mJ/cm$^2$. All the above procedure was conducted in a nitrogen atmosphere.

The resultant film composed of the wholly coating resin and the bonding resin was peeled from the polyester sheet. The wholly coating resin was fixed, and the bonding resin was pulled upward at a rate of pulling of 200 mm/min, with the angle between the two resins being 180° (180° peeling).

The maximum value found on the resultant chart was taken as the adhesion strength between the wholly coating resin and the bonding resin. A silicone oil was mixed with the wholly coating resin. Then, the adhesion strengths of the ribbon optical fiber core cable having the wholly coating resin containing 2%, 1.0%, 0.5%, 0.3% and no of silicone oils were 0.5 g/cm, 2 g/cm, 50 g/cm, 70 g/cm and 150 g/cm, respectively.

Further, eleven kinds of bonding resins were applied to a glass with the thickness of 40 to 50 μm and then cured by irradiation with ultraviolet in an irradiation dose of 500 mJ/cm$^2$. The cured sheet-like samples were measured. Their 2.5% Young's Modulus was measured as the rate of straining per elapsed time of 1 mm/min. and the elongation coefficient at the breakage point was measured as the rate of straining per elapsed time of 50 mm/min. by using JIS 2nd dumbbell based on JIS K 7113. Further, by using the eleven kinds of bonding resins, split type ribbon optical fiber core cables were produced and subjected to various kinds of evaluations.

Further, used wholly coating resins and boding resins were changed to produce Comparative Example 1 which had small adhesion strength of 0.5 g/cm, Comparative Example 2 which had large adhesion strength of 120 g/cm, Comparative Example 3 which had small adhesion strength and small Young's Modulus of 3 kg/cm$^2$ and Comparative Example 4 which had large adhesion strength, large Young's Modulus and small elongation coefficient of 3%.

Respective Examples and Comparative Examples were made to be a bundle having the length of 700 m and the periphery length of 2 m and immersed in water for two weeks. Then, the transmission loss at the wavelength of 1.55 μm was measured by OTDR. In this measurement, if the transmission loss was less than 0.05 dB/km, the result was judged as very good (A); if from 0.05 to 0.10 dB/km, the result was judged as good (B); and if more than 0.10 dB/km, the result was judged as bad (C). The measured transmission losses of Comparative Examples 1 and 3 were measured as 0.13 dB/km and 0.22 dB/km, respectively. Accordingly, optical cables according to Comparative Examples 1 and 3 has a problem in actual use because there is a problem of the reliability if the outer coating of the cable is injured and the like.

The reason for the transmission loss of these Comparative Examples is considered to be that water which permeated from the surface of the bonding resin generated a liquid bubble at the interface between the bonding resin and the wholly coating resin where the adhesion strength was relatively weak. Thus, a difference was generated in the side pressure applied to the optical fibers, thereby increasing the transmission loss.

Figure 7A:
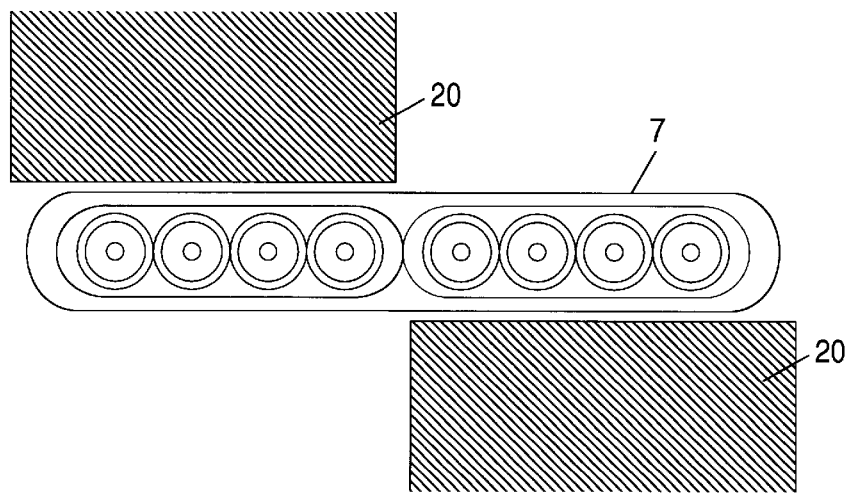
FIGS. 7A to 7C is a schematic view illustrating the measurement by using a jig which cut a right and a left ribbon optical fiber core cables in the vertical direction.
Figure 7B:
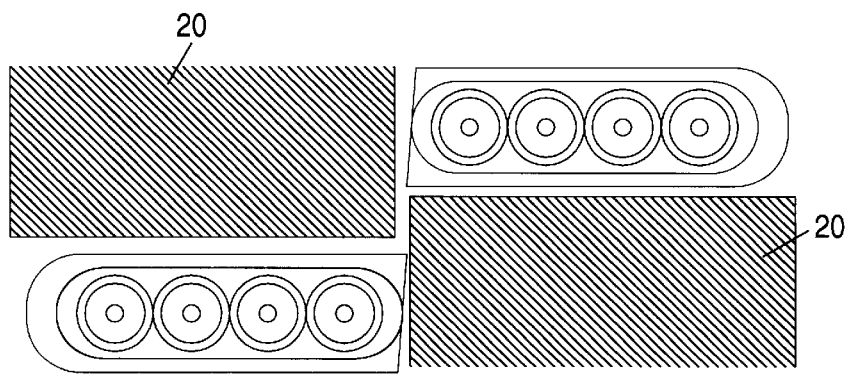
Figure 7C:
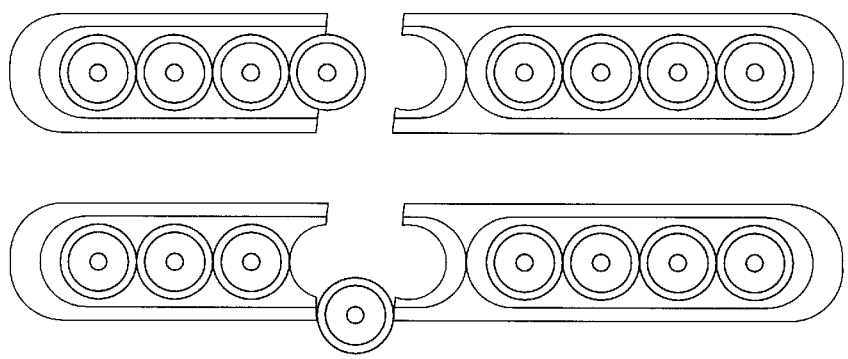

The split ability was measured by using a jig 20 which cut a right and a left ribbon optical fiber core cables in the vertical direction as shown in FIG. 7A. As shown in FIG. 7B, the both ribbon optical fiber core cables were successively split from each other without breaking was judged as success. On the contrary, as shown in FIG. 7C, if the outer coating of one of ribbon optical fiber core cables were broken, it was judged as a failure. In each Examples and Comparative Examples, the split tests were repeated 100 times with respect to 5 m samples. According to the results of this tests, if no failure occurred, it was judged as good (A), and if at least one failure occurred, it was judged as bad (C). These judgement are shown in Table 1.

Examples 1 to 11 exhibited good split ability. However, although Example 11 could be split, large force was necessary to split. This is because the elongation coefficient after curing of the bonding resin was an large as 100% and had viscosity.

Consequently, by setting the adhesion strength in the range of 1 to 100 g/cm, the split type ribbon optical fiber has a reliability necessary for an optical fiber cable and an excellent split ability for a terminal.

On the other hand, for actual use, in order to increase the core cable use efficiency of the split type ribbon optical fiber cable, the right and the left ribbon optical fiber core cable may be branched off at different positions. The split type ribbon optical fiber is necessary to be split even when one of the right and left ribbon optical fiber core cable is in use. During this splitting, it is not desirable that the communication by the ribbon optical fiber core cable in use occurs transmission error. Accordingly, a transmission path in which four optical fiber cores in the right ribbon optical fiber core cable are continuously coupled was produced. While transmitting test signal of wavelength of 1.55 μm and transmission ratio of 2 Mbps, the split type ribbon optical fiber core cable is split and the variation of the code error rate was estimated. For this estimation, the input strength of the optical signal was adjusted to be low and the code error rate before working was adjusted to be 10$^{-12}$. The split working was performed five times. If the maximum code error rate exceeded 10$^{-9}$, it was judged as passable (B) but care needs to be taken during split working. If it did not exceed 10$^{-9}$, it was judged as good (A). As the result of this estimation, the transmission error occurred in Example 9. Accordingly, in the case of a high Young's Modulus, it is understood that the split force is more directly transmitted to the optical fiber core cable causing a transmission error. If it is also considered that the split working while a part of optical fibers are in use is necessary, the bonding resin preferably has a Young's Modulus of 5 to 100 kg/mm$^2$ after curing.

Figure 6:
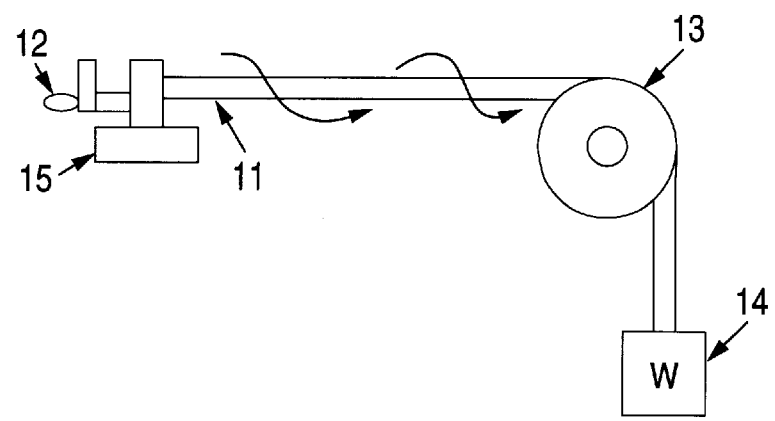
FIG. 6 is a diagrammatic view illustrating the twisting apparatus.

Next, with regard to the manufacture of the optical cable, the necessity of splitting the optical cable during production may be a problem in the split type ribbon optical fiber core cable. FIG. 6 is a diagrammatic view illustrating the appearance of the twisting apparatus used for an experiment. By using this apparatus, the split type ribbon optical fiber core cable was applied the weight 14 of 500 g which was the maximum load during the general production and given a twist of a rotational angle of 900° until a pitch became 200 mm. This test was subjected to eleven kinds of Examples of the split type ribbon optical fiber core cable 11. If it was split, it was judged as passable (B) but care needs to be taken during split working. If it was not split, it was judged as good (A). As the result, the split type ribbon optical fiber core cable of Example 8 split twice. In Example 8, when the load (weight 14) was reduced to 350 g, the split type ribbon optical fiber core cable was not split even if it was twisted. Since Young's Modulus of the bonding resin of Example 8 was as small as 3 kg/mm$^2$, the optical cable broke. Namely, Young's Modulus of the bonding resin after curing is desiraby more than 5 kg/cm$^2$ in view of handling during production.

Further, during production, the split type ribbon optical fiber core cables are guided by many rollers to produce an optical cable. Accordingly, it is desirable to have resistance to an unexpected split due to bending by the roller or the like. Accordingly, the split type ribbon optical fiber core cable was wound around mandrels having the outer diameters of 50 mm and 100 mm fifty times to estimate whether or not it is split. As the result, when the split type ribbon optical fiber core cable of Example 10 was wound around the mandrel having outer diameter of 50 mm, the split occurred three times. Accordingly, the split type ribbon optical fiber core cable of Example 10 which should be used with care with regard to bending was judged as passable (B). This is because the elongation coefficient of the bonding resin is as small as 3%. Accordingly, the resin is easily cracked. Therefore, it is desirable for the elongation coefficient of the bonding resin is desirable more than 5%. Remaining Examples did not split and were judged as good (A).

TABLE 1

|  | Adhesion strength (g/cm) | Young's modulus (kg/mm$^2$) | Elongation Coefficient (%) | Trans. loss after Immersion in hot water | Split ability | Trans. error during split | Resistant to twist test | Resistant to bend |
| --- | --- | --- | --- | --- | --- | --- | --- | --- |
| Example 1 | 50 | 50 | 50 | A | A | A | A | A |
| Example 2 | 2 | 50 | 50 | A | A | A | A | A |
| Example 3 | 70 | 50 | 50 | A | A | A | A | A |
| Example 4 | 50 | 10 | 50 | A | A | A | A | A |
| Example 5 | 50 | 70 | 50 | A | A | A | A | A |
| Example 6 | 50 | 50 | 10 | A | A | A | A | A |
| Example 7 | 50 | 50 | 60 | A | A | A | A | A |
| Example 8 | 50 | 3 | 50 | A | A | A | B | A |
| Example 9 | 50 | 120 | 50 | A | A | B | A | A |
| Example 10 | 50 | 50 | 3 | A | A | A | A | B |
| Example 11 | 50 | 50 | 100 | A | A | A | A | A |
| Comp. Ex. 1 | 0.5 | 50 | 50 | C | A |  |  |  |
| Comp. Ex. 2 | 120 | 50 | 50 | A | C |  |  |  |
| Comp. Ex. 3 | 0.5 | 3 | 50 | C | A |  |  |  |
| Comp. Ex. 4 | 120 | 120 | 3 | A | C |  |  |  |

As described above, the split type ribbon optical fiber core cable of the present invention has the following effects.

By using a combination of a wholly coating resin and a bonding resin in which the adhesion strength between the two resins is in the specific range of from 1 to 100 g/cm, the split type ribbon optical fiber core cable not only can be split into the ribbon optical fiber core cable units without fail, but does not suffer an increase in transmission loss even in a moist-heat or hot-water environment. The split type ribbon optical fiber core cable retains the intact suitability for splitting even when the adhesion strength between the wholly coating resin and the bonding resin is any value within that specific range.

By regulating the Young's modulus of the bonding resin to a value in the specific range of from 5 to 100 kg/mm$^2$, transmission signal errors during splitting and unexpected splitting during cable fabrication can be prevented.

By regulating the elongation coefficient of the bonding resin to a value in the specific range of from 5 to 80%, unexpected splitting can be prevented and the force necessary for splitting can be reduced.

What is claimed is:

1. A split type ribbon optical fiber core cable capable of being split into cables, said split type ribbon optical fiber core cable comprising:

ribbon optical fiber core cable units, each unit comprising a plurality of colored optical fiber core cables arranged in a row;

a coating resin comprising an ultraviolet curable resin which wholly coats said plurality of colored optical fiber core cables; and a bonding resin comprising an ultraviolet curable resin which bonds said coated ribbon optical fiber core cable units arranged in a row;

wherein an adhesion strength between said wholly coating resin and said bonding resin is in the range of 1 to 100 g/cm.

2. The split type ribbon optical fiber core cable as claimed in claim 1, wherein the bonding resin after curing has a Young's modulus in the range of 5 to 100 kg/mm$^2$.

3. The split type ribbon optical fiber core cable as claimed in claim 1, wherein the bonding resin after curing has an elongation coefficient in the range of 5 to 80%.

4. The split type ribbon optical fiber core cable as claimed in claim 1, wherein an adhesion strength between the wholly coating resin and the bonding resin is in the range of 2 to 70 g/cm.

5. The split type ribbon optical fiber core cable as claimed in claim 4, wherein an adhesion strength between the wholly coating resin and the bonding resin is in the range of 3 to 50 g/cm.

6. The split type ribbon optical fiber core cable as claimed in claim 2, wherein the bonding resin after curing has a Young's modulus in the range of 10 to 70 kg/mm$^2$.

7. The split type ribbon optical fiber core cable as claimed in claim 6, wherein the bonding resin after curing has a Young's modulus in the range of 15 to 60 kg/mm$^2$.

8. The split type ribbon optical fiber core cable as claimed in claim 3, wherein the bonding resin after curing has an elongation coefficient in the range of 10 to 60%.

9. The split type ribbon optical fiber core cable as claimed in claim 8, wherein the bonding resin after curing has an elongation coefficient in the range of 20 to 50%.

* * * * *